(12) United States Patent
Liang et al.

(10) Patent No.: US 7,961,936 B2
(45) Date of Patent: Jun. 14, 2011

(54) NON-OVERLAP REGION BASED AUTOMATIC GLOBAL ALIGNMENT FOR RING CAMERA IMAGE MOSAIC

(75) Inventors: Luhong Liang, Beijing (CN); Xiao Xiao, Beijing (CN); Ying Jia, Beijing (CN); Steve W. Deutsch, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1108 days.

(21) Appl. No.: 11/694,778

(22) Filed: Mar. 30, 2007

(65) Prior Publication Data

US 2008/0240612 A1    Oct. 2, 2008

(51) Int. Cl.
*G06K 9/80* (2006.01)
*G06T 15/00* (2011.01)

(52) U.S. Cl. ........................ 382/154; 382/294

(58) Field of Classification Search ............ None
See application file for complete search history.

(56) References Cited

U.S. PATENT DOCUMENTS

| | | | |
|---|---|---|---|
| 6,781,618 B2 * | 8/2004 | Beardsley | 348/43 |
| 2007/0237420 A1 * | 10/2007 | Steedly et al. | 382/284 |
| 2008/0101724 A1 * | 5/2008 | Baker et al. | 382/284 |

OTHER PUBLICATIONS

Thommen Korah et al., Aligning Sequences From Mulitple Cameras, IEEE Journal Article, Jul. 2005, pp. 941-944.*

Bergen, J R., et al., "Hierarchical Model-Based Motion Estimation", *In Second European Conference on Computer Vision*, (May 1992),237-252 pgs.
Baker, H H., et al., "Multi-Viewpoint Uncompressed Capture and Mosaicking with a High-Bandwidth PC Camera Array", *In Second European Conference on Computer Vision*, (May 1992),237-252 pgs.
Capel, D et al., "Automated Mosaicing with Super-resolution Zoom", *IEEE Computer Society Conference*, (Jun. 23-25, 1998),885-891 pgs.
Caspi, Yaron et al., "Alignment of Non-Overlapping Sequences", *Proceedings in Eight IEEE Conference on Computer Vision 2001*, (2001),76-83 pgs.
Cutler, Ross et al., "Distributed Meetings: A Meeting Capture and Broadcasting System", *In Proc. ACM MM Conf.*, (2002),1-10 pgs.
Mallick, Satya P., "Feature Based Image Mosaicing", http://www.cse.ucsd.edu/classes/fa02/cse252c/smallick.pdf, (2002), 1-6 pgs.
Nanda, Harsh et al., "Practical calibrations for a real-time digital omnidirectional camera", *In Proceedings of CVPR, Technical Sketch*, (2001),1-4 pgs.
"Spherical digital video camera", http://www.ptgrey.com/products/ladybug2/index.htm, PointGrey Research and Ladybug 2,(2005),1-2 pg.
Seitz, Steven M., et al., "View Morphing", *In Proceedings of ACM SIGGRAPH 96*, (1996),21-30 pgs.
Shum, H Y., et al., "Panoramic Image Mosaics", *Microsoft Research Technical Report*, MSR-TR97-23, (1997),1-53.
Szeliski, R et al., "Video Mosaics for Virtual Environment", *IEEE Computer Graphics and Applications*, vol. 16, No. 2, (Mar. 1996),22-30.
Szeliski, Richard et al., "Creating Full View Panoramic Image Mosaics and Environment Maps", *ACM SIGGRAPH*, (1997),251-258 pgs.

(Continued)

*Primary Examiner* — Brian P Werner
(74) *Attorney, Agent, or Firm* — Kacvinsky Daisak, PLLC (57) ABSTRACT

Various embodiments are directed to non-overlap region based automatic global alignment for ring camera image mosaic. The non-overlap region based homography calculation may be based on feature points of a planar target appearing in a non-overlap region among images captured by a multi-camera based video capture device. Other embodiments are described and claimed.

8 Claims, 4 Drawing Sheets

OTHER PUBLICATIONS

Zhang, Zhengyou "A Flexible New Technique for Camera Calibration", MSR-TR-98-71, (1998),1-22.

Zoghlami, I et al., "Using geometric corners to build a 2D mosaic from a set of images", *Proceedings of the IEEE Computer Society Conference on Computer Vision and Pattern Recognition*, (1997), 421-425.

"Function cvFindChessBoardCornerGuesses and cvFindCornerSubPix", *Intel Open Source Computer Vision Library (OpenCV)* version 3.1.

Hartley, R. et al., "Multiple view geometry in computer vision", Cambridge University Press, (Jun. 2000).

* cited by examiner

NON-OVERLAP REGION BASED AUTOMATIC GLOBAL ALIGNMENT FOR RING CAMERA IMAGE MOSAIC

BACKGROUND

Mobile and desktop computers may be equipped with a camera such as a complementary metal oxide semiconductor (CMOS) or a charge coupled device (CCD) camera to support video applications. Such cameras typically provide only a limited Field of View (FOV) and require a user to be positioned directly in front of the computer in order to be captured by the camera and appear in the video.

The ring camera is a promising next-generation video capture device for mobile and desktop platforms. A ring camera is a multiple-camera based video capturing device that provides a larger FOV and has been used in conferencing and surveillance applications. Ring cameras may use panoramic image mosaic technology to construct high quality and resolution video from image frames captured by multiple camera modules.

Conventional global alignment approaches that employ an overlap region based panoramic image mosaic calculate homography in terms of the information of some pixels or the coordinates of some feature points appearing in an overlap region. Then, an image stitch can be done according to the homography to get the panoramic image. These homography calculation methods typically require 50% overlap between images.

Maximizing the FOV and resolution of a ring camera system for particular types of camera modules while achieving high-performance and power-efficiency, however, may require minimizing the overlap among the camera modules. When the overlap region among camera modules is minimized, it may be impossible to obtain enough pixels or feature points in the overlap region to perform robust homography calculation. As such, conventional homography calculation algorithms become unstable or unfeasible when the overlap region is very small.

DETAILED DESCRIPTION

Various embodiments are directed to non-overlap region based automatic global alignment for ring camera image mosaic. Numerous specific details are set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is worthy to note that any reference to "one embodiment" or "an embodiment" means that a particular feature, structure, or characteristic described in connection with the embodiment is included in at least one embodiment. The appearances of the phrase "in one embodiment" are not necessarily all referring to the same embodiment.

Figure 1:
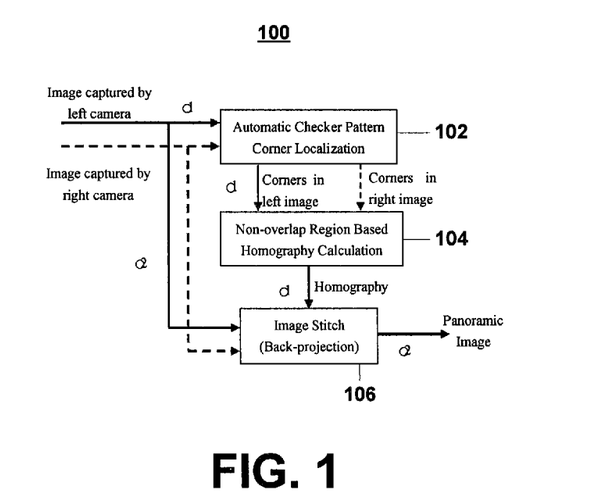
FIG. 1 illustrates a media processing system.

FIG. 1 illustrates a media processing system 100 according to one or more embodiments. In general, the media processing system 100 may comprise various physical and/or logical components for communicating information which may be implemented as hardware, software, or any combination thereof, as desired for a given set of design parameters or performance constraints. Although FIG. 1 may show a limited number of components by way of example, it can be appreciated that a greater or a fewer number of components may be employed for a given implementation.

In various implementations, the media processing system 100 may be arranged to perform one or more networking, multimedia, and/or communications applications for a PC, consumer electronics (CE), and/or mobile platform. In some embodiments, the media processing system 100 may be implemented for a PC, CE, and/or mobile platform as a system within and/or connected to a device such as personal PC, STB, digital TV device, Internet Protocol TV (IPTV) device, digital camera, media player, and/or cellular telephone. Other examples of such devices may include, without limitation, a workstation, terminal, server, media appliance, audio/video (A/V) receiver, digital music player, entertainment system, digital TV (DTV) device, high-definition TV (HDTV) device, direct broadcast satellite TV (DBS) device, video on-demand (VOD) device, Web TV device, digital video recorder (DVR) device, digital versatile disc (DVD) device, high-definition DVD (HD-DVD) device, Blu-ray disc (BD) device, video home system (VHS) device, digital VHS device, a gaming console, display device, notebook PC, a laptop computer, portable computer, handheld computer, personal digital assistant (PDA), voice over IP (VoIP) device, combination cellular telephone/PDA, smart phone, pager, messaging device, wireless access point (AP), wireless client device, wireless station (STA), base station (BS), subscriber station (SS), mobile subscriber center (MSC), mobile unit, and so forth.

In mobile applications, the media processing system 100 may be implemented within and/or connected to a device comprising one more interfaces and/or components for wireless communication such as one or more transmitters, receivers, transceivers, chipsets, amplifiers, filters, control logic, network interface cards (NICs), antennas, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the media processing system 100 may form part of a wired communications system, a wireless communications system, or a combination of both. For example, the media processing system 100 may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The media processing system 100 also may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. Although certain embodiments may be illustrated using a particular communications media by way of example, it may be appreciated that the principles and techniques discussed herein may be implemented using various communication media and accompanying technology.

The media processing system 100 may be arranged to communicate one or more types of information, such as media information and control information. Media information generally may refer to any data representing content meant for a user, such as image information, video information, audio information, A/V information, graphical information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks.

In one or more embodiments, the media processing system 100 may be implemented as a graphics subsystem comprising one or more processors, chipsets, and/or adapters available from Intel Corporation of Santa Clara, Calif. In some implementations, the graphics subsystem may be implemented as a graphics/multimedia platform to deliver high performance video capabilities. For example, the graphics subsystem 102 may be implemented as a graphics and memory controller hub (GMCH) to deliver high video capabilities. The GMCH may be implemented as a PCI chip or as part of a host chipset along with an I/O controller hub (ICH) and a firmware hub (FWH). It can be appreciated that other types of processing devices or systems which are consistent with the described embodiments may be used.

As illustrated, the media processing system 100 may comprise a plurality of functional components or modules. The modules may be implemented by one or more chips or integrated circuits (ICs) and may comprise, for example, hardware and/or software such as logic (e.g., instructions, data, and/or code) to be executed by a logic device. Examples of a logic device include, without limitation, a central processing unit (CPU), microcontroller, microprocessor, general purpose processor, dedicated processor, chip multiprocessor (CMP), media processor, digital signal processor (DSP), network processor, co-processor, input/output (I/O) processor, application specific integrated circuit (ASIC), field programmable gate array (FPGA), programmable logic device (PLD), and so forth. Executable logic may be stored internally or externally to a logic device on one or more types of computer-readable storage media such as volatile or non-volatile memory, removable or non-removable memory, erasable or non-erasable memory, writeable or re-writeable memory, and so forth. The modules may be physically or logically coupled and/or connected by communications media comprising wired communication media, wireless communication media, or a combination of both, as desired for a given implementation.

In one or more embodiments, the media processing system 100 may be arranged to employ panoramic image mosaic technology to construct high quality and resolution video. The panoramic image mosaic technology may implement global alignment (or global registration) utilizing homography to describe the correspondence between images captured by adjacent camera modules and to recover the correspondence between the camera modules via their perspective projection relations to a planar target. It can be appreciated that although some techniques can be used to construct a 360° panoramic image, some embodiments may use a non-360° ring camera system. As such, the term "panoramic image" may refer to the result of the panoramic image mosaic applying to two, three, or more images, which may or may not necessarily cover a 360° FOV.

As shown in FIG. 1, the media processing system 100 may comprise automatic checker pattern corner localization module 102, non-overlap region based homography calculation module 104, and image stitch module 106. The automatic checker pattern corner localization module 102 and the image stitch module 106 may be arranged to receive an image captured by a left camera and an image captured by a right camera.

The automatic checker pattern corner localization module 102 may be arranged to automatically obtain the feature points and the corresponding indices for homography calculation. In one or more embodiments, the automatic checker pattern corner localization module 102 may perform methods based on OpenCV from Intel Corporation to enable homography calculation to be done in a fully-automatic manner.

The non-overlap region based homography calculation module 104 may be arranged to calculate homography in terms of the information (e.g., pixels, feature point coordinates) appearing in a non-overlap region. In one or more embodiments, the non-overlap region based homography calculation module 104 may be implemented for a ring camera system and a planar target for ring camera image mosaic (calibration).

Based on the homography, the image stitch module 106 may be arranged to stitch together images captured by different camera modules (e.g., image captured by left camera and image captured by right camera) to create a panoramic image having a large FOV.

In the embodiment shown in FIG. 1, the route ○ may correspond to a calibration stage, and the route ○ may correspond to a working stage. For example, the end-user could have just shot several images of the checker pattern using a ring camera in a system calibration stage. Then, the media processing system 100 automatically calculates the homography for global alignment (route ○) and finally obtains the high-quality panoramic images in the working stage (route ○).

For purposes of illustration, and not limitation, the non-overlap region based homography calculation method may be made assuming that two camera modules having the same optical center and intrinsic parameters each capture part of a planar checker pattern positioned in front of the two camera modules, and that the column and row numbers of the checker pattern are known.

Figure 2A:
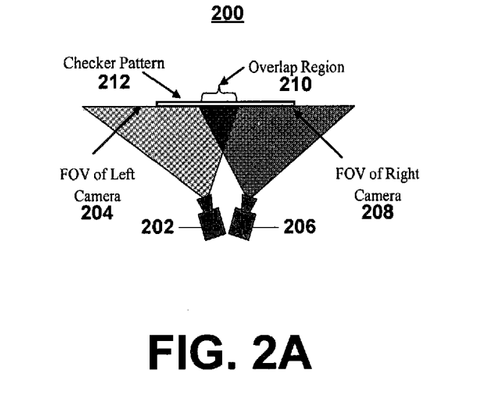
FIG. 2A illustrates a multiple-camera based video capture device.

FIG. 2A illustrates a multiple-camera based video capture device 200 suitable for providing a left image and a right image to media processing system 100 of FIG. 1. In one or more embodiments, the device 200 may be implemented as a ring camera comprising multiple independent camera modules each having an integrated lens and CMOS/CCD sensor to capture the left and right image frames.

As shown, the device 200 may comprise a left camera 202 to provide a left FOV 204 and a right camera 206 to provide a right FOV 208. The intersection of the left FOV 204 and the right FOV 208 define an overlap region 210 of a checker pattern 212.

Figure 2B:
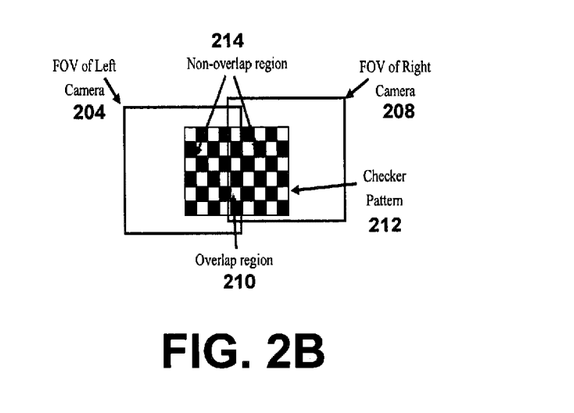
FIG. 2B illustrates a FOV for the device of FIG. 2A.

FIG. 2B illustrates a FOV for the multiple-camera based video capturing device 200 of FIG. 2A. As shown, the left FOV 204 and the right FOV 208 include the overlap region 210 and a non-overlap region 214 of the checker pattern 212. Although some embodiments may be described as using a checker pattern 212 as the planar target for purposes of illustration, it can be appreciated that the planar target may comprise any suitable target object (e.g., book, nature scene, artificial object, etc.) which is consistent with the described embodiments.

Figures 3, 4:
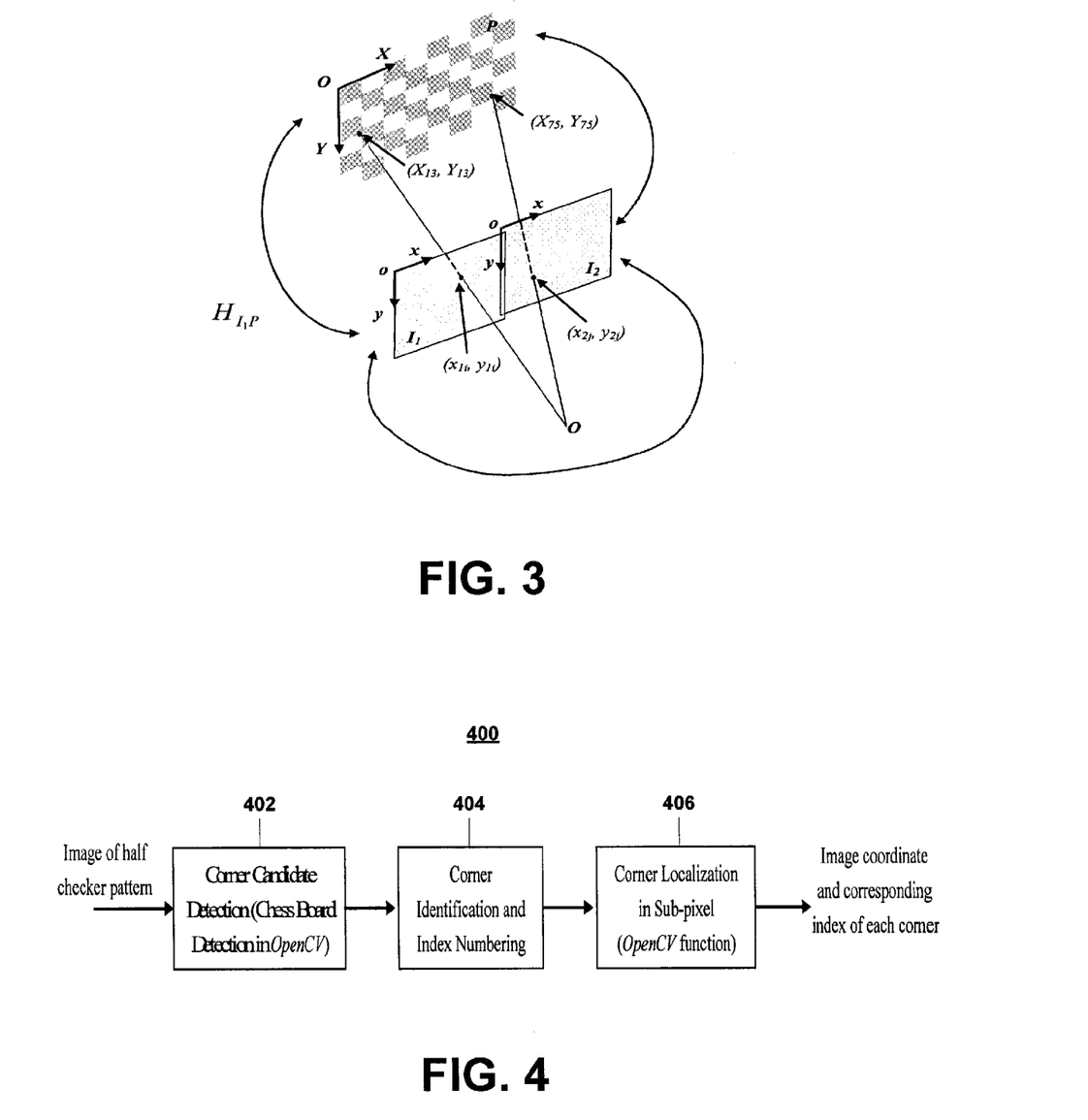
FIG. 3 illustrates projection relations for a checker pattern and image planes.
FIG. 4 illustrates an automatic checker pattern corner localization logic flow.

FIG. 3 illustrates projection relations among the checker pattern 212 and image planes $I_1$ and $I_2$ for calculating homography according to one or more embodiments. In various implementations, each camera (e.g., left camera 202, right camera 206) could capture approximately half of the planar target (e.g., checker pattern 212). Suppose that the homogeneous coordinates of 2D points on image plane $I_1$ is given by:

$$\tilde{m}_1 = (x_1, y_1, 1) \quad (1)$$

The homogeneous coordinates of 2D points on image plane $I_2$ is given by:

$$\tilde{m}_2 = (x_2, y_2, 1) \quad (2)$$

And, the homography describing the correspondence between the points on the two image planes $I_1$ and $I_2$ can be given by:

$$\tilde{m}_1 = H_{I_1 I_2} \cdot \tilde{m}_2 \quad (3)$$

It can be appreciated that for ring camera calibration, calculating the homography $H_{I_1 I_2}$ may be difficult in the event that the overlap region is minimized. Accordingly, a non-overlap region based automatic homography calculation method may be employed. In contrast to conventional global alignment methods that calculate homography in terms of the overlap region, the non-overlap region based homography calculation method may calculate $H_{I_1 I_2}$ indirectly by employing the non-overlap region.

Based on the planar assumption of the checker pattern, homography may be calculated in terms of the coordinates of feature points in the non-overlap regions. Since the non-overlap regions are always much larger than the overlap region in a practical ring camera system, the non-overlap region based homography calculation method can obtain more accurate homography than traditional methods.

As shown in FIG. 3, the upper-left corner is the 2D origin of the checker pattern plane P. The checker pattern corners are numbered using their 2D indices (u, v), where u=0, 1, . . . , M−1 and v=0, 1, . . . , N−1. M and N are the row and column numbers of the checker pattern respectively. Supposing the grid intervals of the checker pattern are $s_c$, $s_r$ in column and row directions respectively, the coordinates of the corner points on the checker pattern plane can be represented by:

$$X = s_c \cdot u, \quad Y = s_r \cdot v \quad (4)$$

It can be appreciated that any points in the checker pattern can be linearly interpolated by the neighboring corners, so that these points can be formulated by equation (4) in case (u, v) become corresponding floating-point numbers.

The image planes of the left and right cameras are denoted by $I_1$, $I_2$, and the upper-left corner is set as the origin of each image plane. By obtaining the coordinates of $n_1$ corner points $(x_{1i}, y_{1i})$ i=1, 2, . . . , $n_1$ in $I_1$ and $n_2$ corner points $(x_{2j}, y_{2j})$ j=1, 2, . . . , $n_2$ in $I_2$ and the corresponding 2D index of each above corner, the homography between $I_1$ and $I_2$ can be calculated as follows.

In various embodiments, the non-overlap region based homography calculation method may comprise calculating homography between a checker pattern plane P and an image plane $I_1$, calculating homography between checker pattern plane P and image plane $I_2$, and calculating homography between image plane $I_1$ and $I_2$.

Calculating the homography between checker pattern plane P and image plane $I_1$ may be implemented as follows. Suppose $\tilde{M} = (X, Y, 1)$ and $\tilde{m}_1 = (x_1, y_1, 1)$ are the homogeneous coordinates of an arbitrary point in the checker pattern P and in image plane $I_1$ respectively. There is a homography that describes the perspective projection between $\tilde{M}$ and $\tilde{m}_1$. If the corresponding floating-point indices $\tilde{m} = (u, v, 1)$ in homogeneous form are used instead of the actual homogenous coordinates $\tilde{M}$ in plane P (see equation 4), the perspective projection between plane $I_1$ and $\tilde{M}$ can be described using a homography as:

$$\tilde{m}_1 = H_{I_1 P} \cdot \tilde{m} \quad (5)$$

In calibration, if $n_1$ corner points $(x_{1i}, y_{1i})$ i=1, 2, . . . , $n_1$ are selected in $I_1$, and their corresponding indices $(u_{1i}, v_{1i})$ in P are obtained, the following equation can be derived:

$$A_1 \cdot h_{I_1 P} = B_1, \text{ where} \quad (6)$$

$$A_1 = \begin{bmatrix} u_{11} & v_{11} & 1 & 0 & 0 & 0 & -u_{11}x_{11} & -v_{11}x_{11} \\ 0 & 0 & 0 & u_{11} & v_{11} & 1 & -u_{11}y_{11} & -v_{11}y_{11} \\ u_{12} & v_{12} & 1 & 0 & 0 & 0 & -u_{12}x_{12} & -v_{12}x_{12} \\ 0 & 0 & 0 & u_{12} & v_{12} & 1 & -u_{12}y_{12} & -v_{12}y_{12} \\ M & M & M & M & M & M & M & M \\ u_{1n} & v_{1n} & 1 & 0 & 0 & 0 & -u_{1n}x_{1n} & -v_{1n}x_{1n} \\ 0 & 0 & 0 & u_{1n} & v_{1n} & 1 & -u_{1n}y_{1n} & -v_{1n}y_{1n} \end{bmatrix}$$

$$B_1 = \begin{bmatrix} x_{11} \\ y_{11} \\ x_{12} \\ y_{12} \\ M \\ x_{1n} \\ y_{1n} \end{bmatrix}$$

$H_{I_1 P}$ can be obtained by calculating the following 8-element vector:

$$h_{I_1 P} = (A_1^T A_1)^{-1} A_1^T B_1 \quad (7)$$

In one or more embodiments, the homography between checker pattern plane P and image plane $I_2$ can be calculated using the same method. It can be appreciated that the corners used may be a few different ones in another part of the checker pattern. Similar to the above, the perspective projection between P and $I_2$ can be formulated using a homography:

$$\tilde{m}_2 = H_{I_2 P} \cdot \tilde{m} \quad (8)$$

Using the same method, $H_{I_2 P}$ can be calculated given $n_2$ corner points $(x_{2j}, y_{2j})$ j=1, 2, . . . , $n_2$ and their corresponding 2D indices by:

$$h_{I_2 P} = (A_2^T A_2)^{-1} A_2^T B_2 \quad (9)$$

where the definition of $A_2$ and $B_2$ are similar to equation (6).

In one or more embodiments, the homography between image plane $I_1$ and $I_2$ can be calculated as follows. Since $H_{I_1 P}$ and $H_{I_2 P}$ described the general projection relations among the checker pattern and image planes, and since equation (5) and (8) described the general perspective projection relations between P and $I_1$ or $I_2$ respectively, $H_{I_1 I_2}$ can be calculate by $H_{I_1I_2} = H_{I_1P} \cdot H_{I_2P}^{-1}$, and the homography between image plane $I_1$ and $I_2$ can be calculated by:

$$\tilde{m}_1 = H_{I_1I_2} \cdot \tilde{m}_2, \text{ where } H_{I_1I_2} = H_{I_1P} \cdot H_{I_2P}^{-1} \quad (10)$$

It can be appreciated that the above method does not rely on the points in the overlap region since $H_{I_1P}$ and $H_{I_2P}$ were calculated from corners independently selected in $I_1$ and $I_2$. Because the above method does not rely on the corner points appearing in both images (i.e. in the overlap region), the method can deal with the calibration of a ring camera having a minimized overlap region. Therefore, the non-overlap region based homography calculation method is able to overcome the overlap problems present in ring camera calibration. In practice, the feature points on the checker pattern can be manually marked or localized using the automatic method described below.

FIG. 4 illustrates an automatic checker pattern corner localization logic flow 400 according to one or more embodiments. The logic flow 400 may be implemented, for example, by the media processing system 100 of FIG. 1.

In various implementations, each camera only captures approximately half of the checker pattern where the exact number of the visible columns was unknown. Accordingly, the automatic checker pattern corner localization logic flow 400 may be arranged to deal with this case based on some reasonable assumptions of the pose, location and set-up of the checker pattern. In contrast to conventional detection algorithms (e.g., OpenCV) that localize the corner in a complete checker pattern, the logic flow 400 localizes the corners in approximately half of the checker pattern where the exact number of the visible columns was unknown.

As shown, the automatic check pattern corner localization logic flow 400 may comprise corner candidate detection 402, corner identification and index numbering 404, and corner localization in sub-pixel 406. In various implementations, corner candidate detection 402 and corner localization in sub-pixel 406 may be performed using conventional methods such as the chess board detection algorithm in OpenCV to obtain all the corner candidates in the input image and the image gradient based corner localization algorithm in OpenCV to refine the locations of the identified corners to sub-pixel accuracy.

In one or more embodiments, corner identification and index numbering 404 identifies and numbers the 2D indices of each corner candidate in the image of an incomplete checker pattern. Without loss of its ease of use, corner identification and index numbering 404 may be performed assuming that at least two complete columns of the corners were correctly detected by corner candidate detection 402 and that the plane of the checker pattern is approximately perpendicular to the bisector of the optical axes of the two camera modules with a bias within 30° in any direction.

Figure 5:
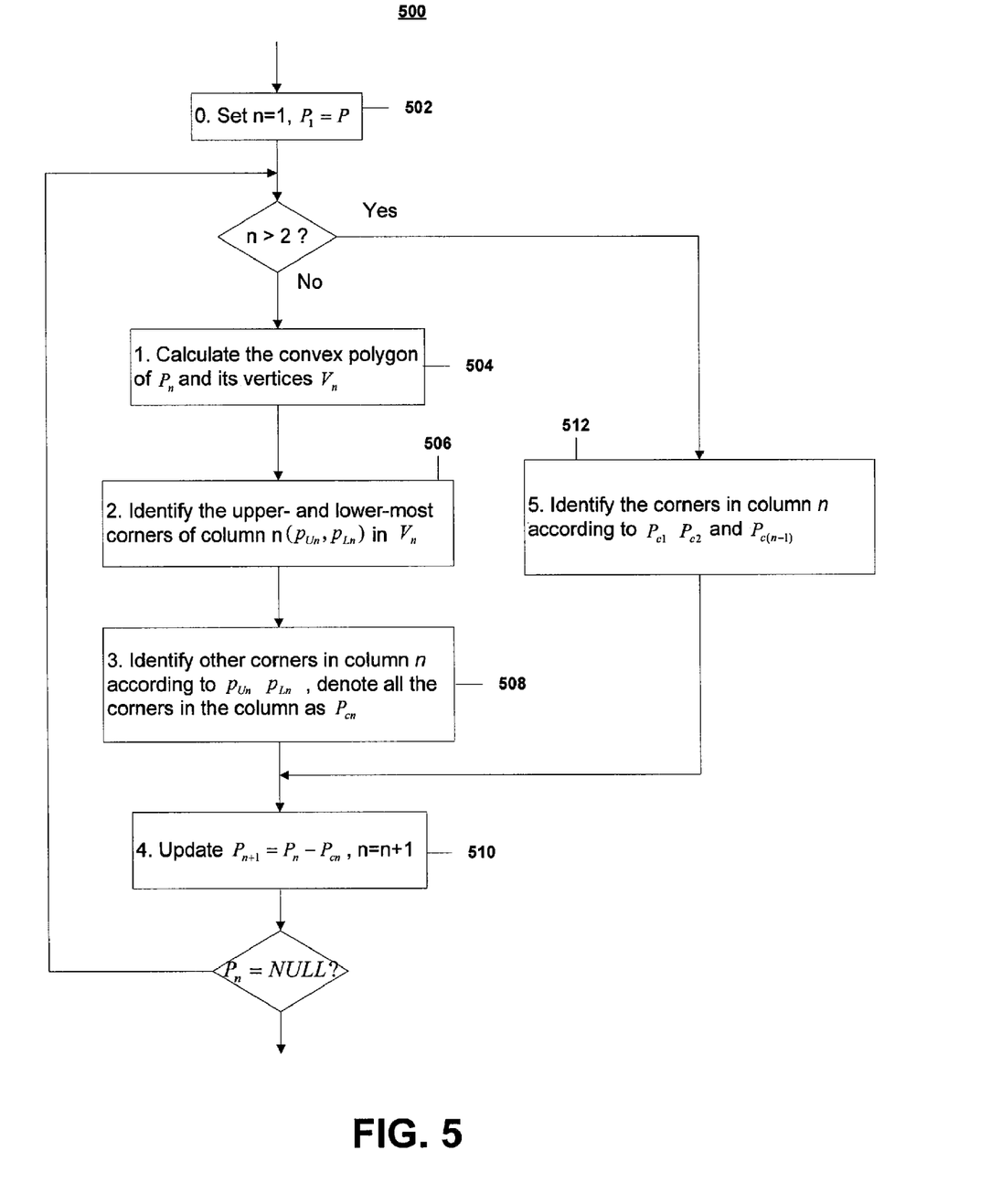
FIG. 5 illustrates a corner index identification logic flow.

FIG. 5 illustrates a corner identification and index numbering logic flow 500 according to one or more embodiments. The logic flow 500 may be implemented, for example, as part of the automatic checker pattern corner localization logic flow 400 of FIG. 4.

For purposes of illustration, and not limitation, the corner identification and index numbering logic flow 500 may be performed using two camera modules and an image captured by the left camera module in which the left half of the checker pattern was in the right part of the image. In one or more embodiments, the logic flow 500 may identify the 2D index of the corner column by column as follows.

Let P represented the detected corners. Denote the corner candidates as P and the column index as n. Set n equal to 1 and the current corner candidate $P_n$ that is to be identified equal to P (block 502). As shown in FIG. 3, the origin of the coordinate system on the checker pattern is the upper-left corner with index (0, 0). However, corner candidate detection 402 detected the corners internal to the pattern region. Accordingly, the column index of the left-most detected corner points should be 1. Since corners in the first two columns (e.g., two left-most columns) were visible and correctly detected, these two columns are processed first as follow.

Calculate the convex polygon of the current corners $P_n$ and obtain the polygon vertices $V_n$ (block 504). It is apparent that the upper- and lower-most corner points in column n were in $V_n$.

Figure 6:
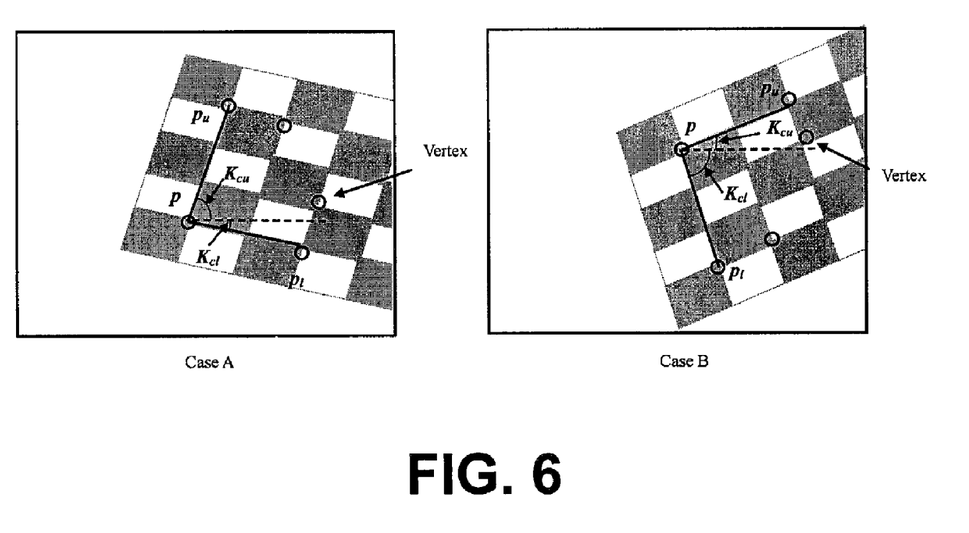
FIG. 6 illustrates exemplary input images.

Identify the upper- and lower-most corners of the column n by analyzing the coordinates of the corner candidates in $V_n$ (block 506). According to the assumption, the input image should be one of the cases shown in FIG. 6. First, find the left-most vertex p which must be either the upper- or lower-most corner of column n. Then, find the upper-most vertex $p_u$ and lower-most vertex $p_l$, and calculate $K_{cu}$ (the slope of line $\overline{pp_u}$) and $K_{cl}$ (the slope of line $\overline{pp_l}$) respectively. With the limited pose variation of the checker pattern:

if $K_{cu} > K_{cl}$, $p_{Un} = p_u$ $p_{Ln} = p$ else, $p_{Un} = p$ $p_{Ln} = p_l$ \quad (11)

where $P_{Un}$ and $P_{Ln}$ are the upper- and lower-most corner of the column n respectively. The indices of these two corners are (n, 1) and (n, M−1) respectively, where M>2 is the row number of the checker pattern.

Identify other corners in column n between $P_{Un}$ and $P_{Ln}$ (block 508). Since the number of the rows of the checker pattern and the coordinates of $P_{Un}$, $P_{Ln}$ were known, coordinates of the corners between $P_{Un}$ and $P_{Ln}$ can be estimated. For instance, supposing that the row number of the checker pattern is M>2, the estimated location of corner (n, m) can be calculated by:

$$x_{nm} = \frac{m-1}{M-2} \cdot (x_{n(M-1)} - x_{n1}) + x_{n1} \quad (12)$$
$$y_{nm} = \frac{m-1}{M-2} \cdot (y_{n(M-1)} - y_{n1}) + y_{n1}$$

where $(x_{n1}, y_{n1})$ and $(x_{n(M-1)}, y_{n(M-1)})$ are the coordinates of $P_{Un}$ and $P_{Ln}$ respectively. Then the coordinates of all other corner candidates in $P_n$ were checked. If the distance between one corner candidate and the estimated location was less than a certain threshold (e.g. 15% of the estimated row interval), the corner was marked as the index of this location.

Update the $P_n$ by removing the identified corners from it (block 510). For column 1 and 2, repeat steps (1) through (4) (blocks 504, 506, 508, and 510) to identify the indices. As for other columns, since some corners in one column may be invisible, a different method is used as follows.

Using equation (13), estimate the coordinates of the corners in column n (n>2) according to the identified corners in column 1, 2 and n−1. For each estimated location, all the remaining corner candidates in $P_n$ were checked. The corner was identified (block 512) if the distance between one corner candidate and the estimated location is less than a certain threshold (e.g., 15% of the minimum of the estimated column and row intervals).

$$x_{nm} = (x_{2m} - x_{1m}) + x_{(n-1)m}$$
$$y_{nm} = (y_{2m} - y_{1m}) + y_{(n-1)m} \quad (13)$$

Then, update $P_n$ and n (block 510) and repeat the above until $P_n$ is empty or there is no matched candidate in $P_n$. As for the image captured by the camera module, a mirror-reflected method may be used to identify the corners starting from the right-most column, and the algorithm may be applied in a similar manner.

In the above, the perspective distortion caused by the off-axis rotations of the checker pattern is ignored but will not cause any incorrect result if the appropriate thresholds are selected in corner checking. Since the rotations in each direction were limited to 30°, the distortion should not cause any incorrect result if appropriate thresholds are employed.

In the above, some details on result verification and exceptional processing were omitted. For instance, if any corner was absent in column 1 or 2 (block 508), the algorithm returned a failure message. The slopes of the column 1 and 2 were also compared, and if the difference was larger than a threshold, the corner identification was also considered a failure. Similar verification methods may be applied to other steps.

In various implementations, the described embodiments comprise a non-overlap region based automatic global alignment method for ring camera image mosaic. The homography calculation approach utilizes the feature points on a planar target appearing in the non-overlap region of the images, which solve the minimized overlap problem in ring camera calibration. The non-overlap region based homography calculation method may provide a straight forward and low-cost way for a manufacturer or end-user to perform ring camera calibration (global alignment).

Some embodiments may implement automatic checker pattern corner localization to enable ring camera calibration (global alignment) to be done automatically. For example, the described embodiments may enable the manufacturer or end-user just capturing several still images of the checker pattern to perform ring camera calibration (global alignment) in a fully automatic manner.

In various implementations, the described embodiments may provide a ring camera system with a calibration method to guarantee panoramic video quality in case the low-cost ring camera form-factor has error or distortion due to the manufacture or usage reasons. The described embodiments may be implemented for integration solutions for a ring camera, such as integration of a ring camera into a mobile or desktop platform. The described methods can be implemented as part of the driver software of the video capture devices or as a feature of the related chipset (e.g., GMCH).

The described embodiments may be implemented for discrete ring camera devices such as in driver software or as a feature of the control or codec chips of the device. The described embodiments also may be implemented as device calibration software (module) in applications which employ a ring camera as the video capture device. These applications include, but are not limited to, conferencing and surveillance in digital home, digital office and digital health based applications.

It can be appreciated that the described embodiments can be extended to any situation using a plane as the target where a few feature points in it can be localized in the captured images and the corresponding relative 2D physical location among these points are known.

Although some embodiments may be illustrated and described as comprising exemplary functional components or modules performing various operations, it can be appreciated that such components or modules may be implemented by one or more hardware components, software components, and/or combination thereof The functional components and/ or modules may be implemented, for example, by logic (e.g., instructions, data, and/or code) to be executed by a logic device (e.g., processor). Such logic may be stored internally or externally to a logic device on one or more types of computer-readable storage media.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

Some embodiments may be implemented as an article of manufacture comprising a computer-readable storage medium to store executable instructions for performing various operations as described herein. The computer-readable storage medium may include one or more types of storage media capable of storing data, including volatile memory or, non-volatile memory, removable or non-removable memory, erasable or non-erasable memory, writeable or re-writeable memory, and so forth. The computer-readable medium may store instructions that, if executed by a computing system, may cause the computing system to perform a method and/or operations in accordance with the described embodiments. Such a computing system may include, for example, any suitable computing platform, computing device, computer, processing platform, processing system, processor, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A media processing system comprising:
a logic device;
a non-overlap region based homography calculation module executing on the logic device to calculate homography based on feature points of one planar target appearing in a non-overlap region among images captured by a multi-camera based video capture device; and an automatic checker pattern corner localization module to automatically obtain the feature points and corresponding indices for homography calculation, identify corners and number indices in an incomplete planar target, calculate a convex polygon of current corners and obtain polygon vertices, identify upper- and lower-most corners of a column by analyzing points in the polygon vertices, identify other corners in the column with upper- and lower-most corners, and identify remaining corners in other columns by location estimation.

2. The media processing system of claim 1, the non-overlap region based homography calculation module to calculate homography between a target plane and a first image plane, calculate homography between the target plane and a second image plane, and calculate homography between the first image plane and the second image plane.

3. The media processing system of claim 1, the multi-camera based video capture device having a left field of view and a right field of view including an overlap region and the non-overlap region of the planar target.

4. The media processing system of claim 1, further comprising an image stitch module to create a panoramic image based on the homography.

5. A mobile system comprising an antenna coupled to the media processing system of claim 1.

6. A method comprising:

calculating homography based on feature points of one planar target appearing in a non-overlap region among images captured by a multi-camera based video capture device;

creating a panoramic image based on the homography;

automatically obtaining the feature points and corresponding indices for homography calculation;

identifying corners and number indices in an incomplete planar target;

calculating a convex polygon of current corners;

obtaining polygon vertices;

identifying upper- and lower-most corners of a column by analyzing points in the polygon vertices;

identifying other corners in the column with upper- and lower-most corners; and identifying remaining corners in other columns by location estimation.

7. The method of claim 6, comprising:

calculating homography between a target plane and a first image plane;

calculating homography between the target plane and a second image plane; and calculating homography between the first image plane and the second image plane.

8. An article of manufacture comprising a non-transitory computer-readable storage medium containing instructions that if executed enable a computing system to perform the method of claim 6.

* * * * *